(12) United States Patent
Kitano (10) Patent No.: US 8,939,244 B2
(45) Date of Patent: Jan. 27, 2015

(54) VEHICLE

(75) Inventor: Eiji Kitano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/978,816

(22) PCT Filed: Feb. 8, 2011

(86) PCT No.: PCT/JP2011/052639
§ 371 (c)(1),
(2), (4) Date: Jul. 9, 2013

(87) PCT Pub. No.: WO2012/107999
PCT Pub. Date: Aug. 16, 2012

(65) Prior Publication Data
US 2013/0310215 A1    Nov. 21, 2013

(51) Int. Cl.
| B60K 13/02 | (2006.01) |
| B60W 20/00 | (2006.01) |
| B60K 6/445 | (2007.10) |
| B60W 10/06 | (2006.01) |
| B60W 10/08 | (2006.01) |

(52) U.S. Cl.
CPC ............... *B60W 20/40* (2013.01); *B60K 6/445* (2013.01); *B60W 10/06* (2013.01); *B60W 10/08* (2013.01); *B60W 20/00* (2013.01); *B60W 20/1082* (2013.01); *Y02T 10/6239* (2013.01); *Y10S 903/945* (2013.01); *B60Y 2300/474* (2013.01); *Y02T 10/54* (2013.01)

USPC ......................................... 180/68.3; 903/945

(58) Field of Classification Search
USPC ........................... 180/68.1–68.3, 309; 60/297
See application file for complete search history.

(56) References Cited

U.S. PATENT DOCUMENTS

| 6,470,985 B1 * | 10/2002 | Inada et al. ............... 180/65.245 |
| 7,728,535 B2 * | 6/2010 | Kumar et al. ................. 318/362 |
| 2004/0238243 A1 * | 12/2004 | King et al. .................... 180/65.2 |
| 2012/0125705 A1 | 5/2012 | Hashimoto et al. |

FOREIGN PATENT DOCUMENTS

| JP | A-2000-316205 | 11/2000 |
| JP | A-2009-220753 | 10/2009 |
| JP | A-2009-225603 | 10/2009 |
| JP | A-2009-274478 | 11/2009 |
| JP | A-2009-286337 | 12/2009 |
| WO | WO 2011/114417 A1 | 9/2011 |

* cited by examiner

*Primary Examiner* — John Walters
*Assistant Examiner* — James Triggs
(74) *Attorney, Agent, or Firm* — Oliff PLC (57) ABSTRACT

A vehicle includes an engine, a first MG, a second MG, a PCU, a battery, and an EHC. The PCU is connected to the battery via a positive line and a negative line. The PCU is connected to the first MG via a 3-phase power line. The PCU is connected to the second MG via a 3-phase power line. The EHC has one end connected to a positive branch line branching off from a W-phase power line among the 3-phase power lines between the PCU and first MG. The EHC has the other end connected to a negative branch line branching off from a negative line between the PCU and battery.

10 Claims, 11 Drawing Sheets

VEHICLE

TECHNICAL FIELD

The present invention relates to a vehicle including an electrical heated catalyst for purifying exhaust gas from the internal combustion engine.

BACKGROUND ART

A vehicle including an internal combustion engine is generally provided with a catalyst to purify exhaust gas from the internal combustion engine. The exhaust cannot be purified sufficiently unless the catalyst has reached an activation temperature. Conventionally, there has been proposed an electrical heated catalyst (hereinafter, also referred to as "EHC") configured to allow the catalyst to be heated by an electric heater or the like.

Japanese Patent Laying-Open No. 2009-225603 (PTL 1) in association with the technique to heat the EHC discloses a vehicle including an AC motor for driving the vehicle, a power storage device storing electric power to be supplied to the AC motor, and a conversion device for converting the DC current from the power storage device into AC current for feeding the AC motor. A coil directed to heating a catalyst is connected between the conversion device and the AC motor. By energizing the catalyst-heating coil by the current flowing through the AC motor, the catalyst is heated.

CITATION LIST

Patent Literature

PTL 1: Japanese Patent Laying-Open No. 2009-225603

SUMMARY OF INVENTION

Technical Problem

The approach disclosed in PTL1 has the catalyst-heating coil connected between the conversion device and AC motor. In order to warm up the catalyst, the AC motor must be driven even if the torque from the AC motor is not required. This is a waste of power consumption. Furthermore, even in the case where the torque of the AC power is required, the EHC temperature cannot be controlled with favorable accuracy since the current applying amount to the catalyst-heating coil cannot be controlled independently of the current applying amount to the AC motor.

The present invention is directed to solving the problems set forth above. An object of the present invention is to control the catalyst temperature with favorable accuracy while heating the catalyst (EHC) exploiting the current flowing between the conversion device and motor.

Solution to Problem

A vehicle according to the present invention includes a power storage device, a conversion device connected to the power storage device via a positive line and a negative line for converting DC current from the power storage device into AC current, a first motor connected to the conversion device via a first plurality of power lines, and driven by the AC current converted at the conversion device, a second motor connected to the conversion device via a second plurality of power lines, and driven by the AC current converted at the conversion device, an engine coupled to the first and second motors via a planetary gear device, and an electrical heated catalyst device purifying exhaust of the engine. The catalyst device has one end connected to a first branch line branching off from any one of the first plurality of power lines, and heated by current supplied via the first branch line.

Preferably, the other end of the catalyst device, at a side opposite to the one end, is connected to a second branch line branching off from the negative line.

Preferably, the first motor is rotated by the power of the second motor transmitted via the planetary gear device to generate back electromotive force, during a motor-running mode in which the vehicle runs by the power of the second motor in a state where the engine is stopped. The catalyst device is heated by the current generated by the back electromotive force of the first motor, circulating between the first motor and the catalyst device through the first and second branch lines during a motor-running mode.

Preferably, the conversion device includes a converter converting voltage from the power storage device for output, a first inverter converting DC current output from the converter into AC current for output onto the first plurality of power lines, and a second inverter converting DC current output from the converter into AC current for output onto the second plurality of power lines. The vehicle further includes an open/close circuit configured to enable the current applying path of the catalyst device to open and close, and a control device for controlling the conversion device and the open/close circuit. The control device controls, during a motor-running mode, the current supplied to the second motor by controlling the converter and second converter while controlling the current supplied to the catalyst device by controlling the open/close circuit and the first inverter.

Preferably, the control device closes the open/close circuit, when the catalyst device is to be warmed up during a motor-running mode, such that current generated by the back electromotive force of the first motor is supplied to the catalyst device via the first branch line.

Preferably, the control device controls the first inverter such that the DC current output from the converter is supplied to the catalyst device when the catalyst device is to be warmed up during a motor-running mode.

Preferably, the control device controls the first inverter such that voltage less than or equal to the voltage output from the converter is applied to the catalyst device via the first inverter when the catalyst device is to be warmed up during a motor-running mode.

Preferably, during a motor-running mode, the control device estimates the current generated by the back electromotive force of the first motor based on the rotation phase and rotation speed of the first motor, and controls the first inverter such that the current applying amount to the catalyst device is adjusted based on the estimated result.

Preferably, the other end of the catalyst device, at the side opposite to the one end, is connected to a second branch line branching off from a power line among the first plurality of power lines, differing from the power line to which the first branch line is connected. The conversion device includes a converter converting voltage from the power storage device for output, a first inverter converting DC current output from the converter into AC current for output onto the first plurality of power lines, and a second inverter converting DC current output from the converter into AC current for output onto the second plurality of power lines. The vehicle includes a switching device provided on the first branch line and the power line to which the first branch line is connected, configured to allow connection of the first inverter to be switched to one of the first motor and the catalyst device, and a control device controlling the conversion device and the switching device. The first motor is rotated by the power of the second motor transmitted via the planetary gear device to generate back electromotive force during a motor-running mode in which the vehicle runs by the power of the second motor in a state where the engine is stopped. The control device causes the DC current output from the converter to be supplied to the catalyst device via the first inverter by controlling the switching device such that the first inverter is connected to the catalyst device when the catalyst device is to be warmed up during a motor-running mode.

Preferably, the control device controls the current applying amount to the catalyst device by controlling the first inverter.

Advantageous Effects of Invention

The present invention allows the catalyst temperature to be controlled with favorable accuracy while the catalyst (EHC) is heated exploiting current flowing between the conversion device and the first motor.

DESCRIPTION OF EMBODIMENTS

Embodiments of the present invention will be described in detail hereinafter with reference to the drawings. In the drawings, the same or corresponding elements have the same reference characters allotted, and description thereof will not be repeated.

[First Embodiment]

Figure 1:
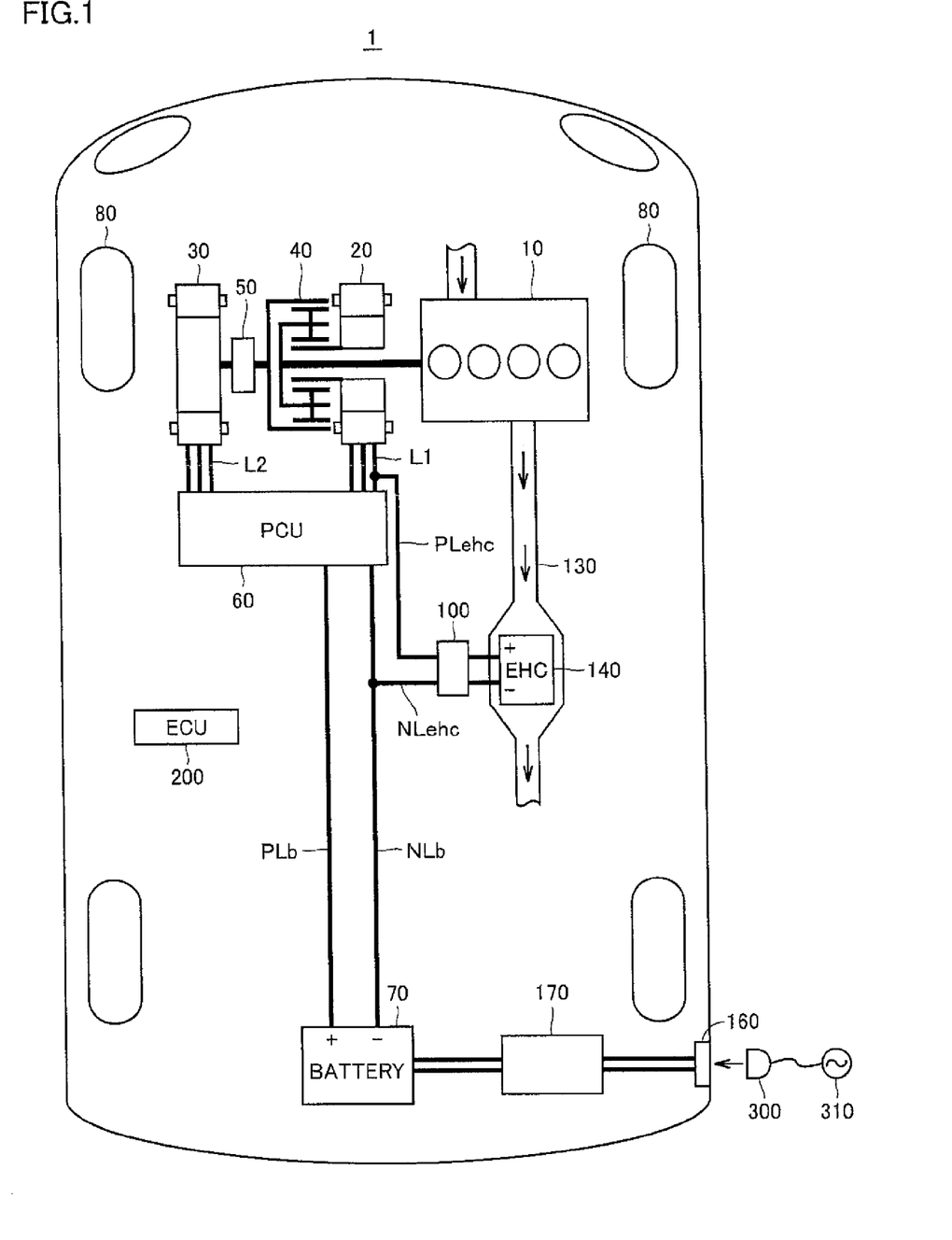
FIG. 1 represents an entire block diagram of a vehicle.

FIG. 1 represents an entire block diagram of a vehicle 1 according to the first embodiment. Vehicle 1 includes an engine 10, a first MG (Motor Generator) 20, a second MG 30, a power split device 40, a reduction gear 50, a power control unit (hereinafter, also referred to as "PCU") 60, a battery 70, a drive wheel 80, and an electronic control unit (hereinafter, also referred to as "ECU") 200.

Engine 10 is an internal combustion engine generating the driving power to rotate a crankshaft by the combustion energy generated when air-fuel mixture is burned.

First MG 20 and second MG 30 are multi-phase (in the present embodiment, the three phases of U-phase, V-phase and W-phase) permanent magnet synchronous motors. Alternatively, first MG 20 and second MG 30 may be single phase motors.

Vehicle 1 runs by the power output from at least one of engine 10 and second MG 30. The motive power generated from engine 10 is divided by power split device 40 into two paths, i.e., one path through which the power is transmitted to drive wheel 80 via reduction gear 50, and the other through which the power is transmitted to first MG 20.

Power split device 40 is formed of a planetary gear including a sun gear, a pinion gear, a carrier, and a ring gear. The pinion gear engages the sun gear and the ring gear. The carrier rotatably supports the pinion gear, allowing to turn on its axis, and is coupled to a crankshaft of engine 10. The sun gear is coupled to the rotation shaft of first MG 20. The ring gear is coupled to the rotation shaft of second MG 30 and reduction gear 50. By the coupling of engine 10, first MG 20 and second MG 30 via power split device 40 formed of a planetary gear, the rotation speed Ne of engine 10, rotation speed Nu1 of first MG 20, and rotation speed Nm2 of second MG 30 bear the relationship connected by a straight line in a nomographic chart.

PCU 60 is connected to battery 70 via a positive line PLb and a negative line NLb. PCU 60 is connected to first MG 20 via 3-phase power line L1 (U-phase power line L1$u$, V-phase power line L1$v$, W-phase power line L1w). Further, PCU 60 is connected to second MG 30 via 3-phase power line L2 (U-phase power line L2$u$, V-phase power line L2$v$, W-phase power line L2w).

PCU 60 is controlled by a control signal from ECU 200. PCU 60 converts DC power supplied from battery 70 into AC power to allow the drive of first MG 20 and second MG 30. PCU 60 outputs the converted AC power to first MG 20 and second MG 30 via power lines L1 and L2, respectively. Accordingly, first MG 20 and second MG 30 are driven by the electric power stored in battery 70. PCU 60 is capable of converting the AC power generated by first MG 20 and second MG 30 into DC power to charge battery 70.

Battery 70 is a direct current power supply storing electric power for driving first MG 20 and second MG 30, and is formed of a secondary battery such as of nickel-metal hydride, lithium ion, or the like. The voltage of battery 70 is approximately 200V, for example. A capacitor of a large capacitance may be employed instead of battery 70.

ECU 200 incorporates a CPU (Central Processing Unit) and a memory, not shown, configured to execute a predetermined operation process based on information stored in the memory.

Vehicle 1 can switch between a motor-running mode running by the power of second MG 30 with engine 10 stopped (hereinafter, referred to as "EV-running") and a hybrid-running mode running by the power of both engine 10 and second MG 30 (hereinafter, referred to as "HV-running"). ECU 200 controls engine 10, first MG 20, and second MG 30 such that vehicle 1 is driven in the EV-running mode or HV-running mode.

Figure 2:
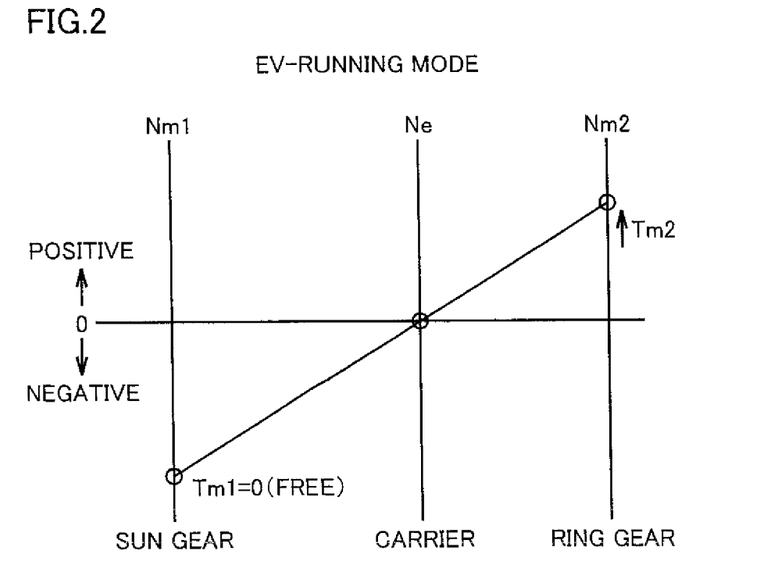
FIG. 2 is a nomographic chart in an EV-running mode.

FIG. 2 represents a nomographic chart in an EV-running mode. ECU 200 stops engine 10 (engine rotation speed Ne=0) in the HV-running mode, and controls torque Tm2 of second MG 30 (the current supplied to second MG 30) such that the power required by the user is realized by the power of second MG 30. At this stage, ECU 200 sets first MG 20 at a free state (torque Tm1 of first MG 20 set at 0). As a result, when vehicle 1 is to move forward in the EV-running mode (when Ne=0, Nm2>0), first MG 20 is rotated in the negative direction by the power of second MG 30 transmitted via power split device 40 (attains Nm1<0), as shown in FIG. 2.

Returning to FIG. 1, vehicle 1 that is the so-called plug-in type hybrid vehicle includes a charge port 160 and a charger 170 for charging battery 70 with the electric power of an external power supply 310 provided external to vehicle 1. Charge port 160 is configured to allow connection with a connector 300 of external power supply 310. Charger 170 is controlled by a control signal from ECU 200 to convert the electric power supplied from external power supply 310 into electric power suitable for charging battery 70.

Vehicle 1 further includes an exhaust manifold 130. The exhaust gas from engine 10 is emitted to the atmosphere through exhaust manifold 130.

An EHC (electrical heated catalyst) 140 is provided in the path of exhaust manifold 130. EHC 140 is configured to allow the catalyst for purifying exhaust gas to be electrically heated. EHC 140 may apply any of the various well-known types.

EHC 140 has one end connected to a positive branch line PLehc branching off from a power line of one phase (W-phase power line L1w in the present embodiment; refer to FIG. 3) among the 3-phase power lines L1 between PCU 60 and first MG 20. EHC 140 has the other end connected to a negative branch line NLehc branching off from negative line NLb between PCU 60 and battery 70. A junction box 100 is provided on positive branch line PLehc and negative branch line NLehc.

Figure 3:
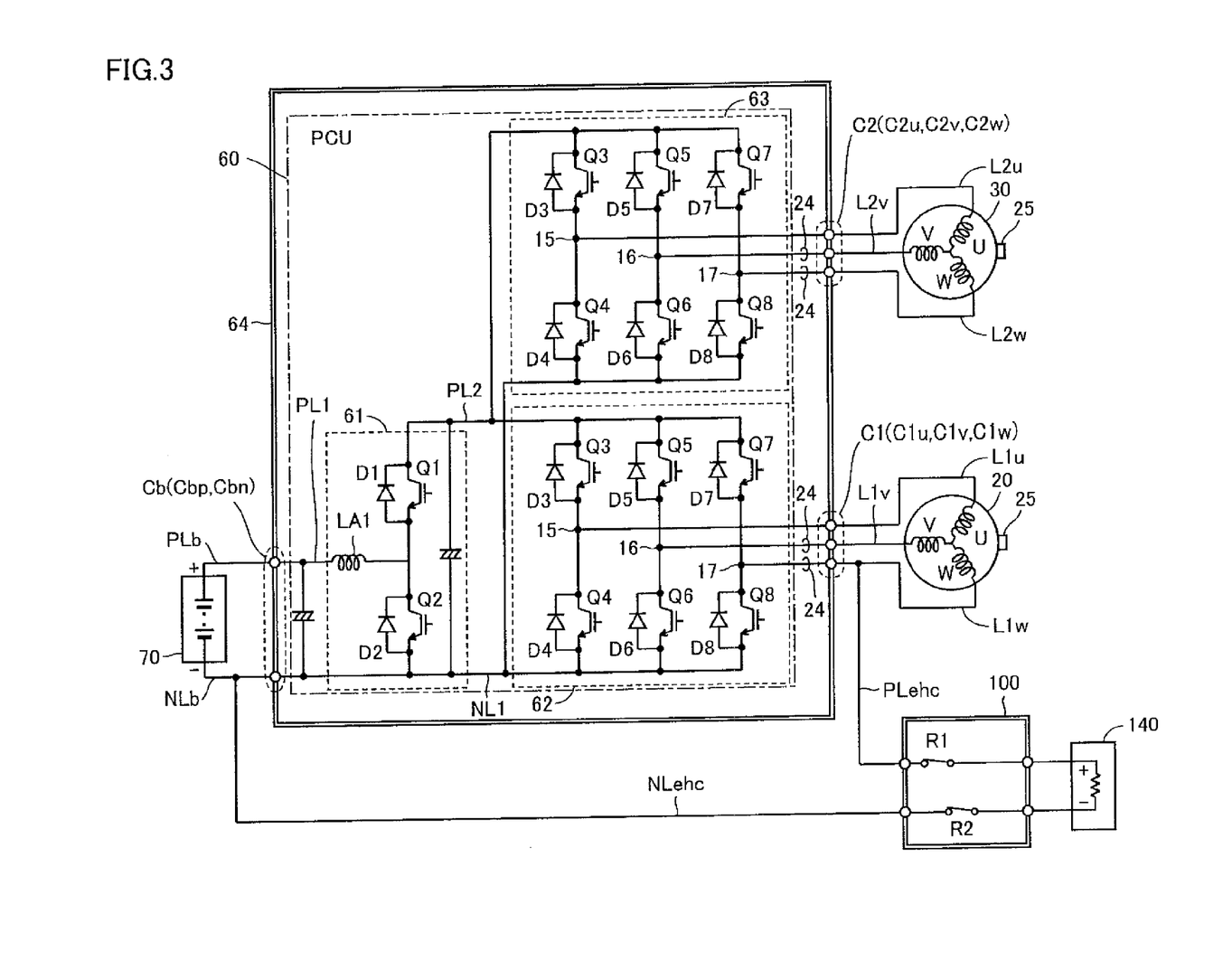
FIG. 3 represents a first circuit configuration of a first MG, a second MG, a PCU, a battery, and an EHC.

FIG. 3 represents a circuit configuration of first MG 20, second MG 30, PCU 60, battery 70, and EHC 140.

PCU 60 is enclosed in a case 64. Case 64 includes an input terminal Cb to which battery 70 is connected (specifically, an input terminal Cbp to which positive line PLb is connected, and an input terminal Cbn to which negative line NLb is connected), an output terminal C1 to which first MG 20 is connected (specifically, output terminals C1$u$, C1$v$ and C1$w$ to which power lines L1$u$, L1$v$ and L1$w$, respectively, are connected), and an output terminal C2 to which second MG 30 is connected (specifically, output terminals C2$u$, C2$v$ and C2$w$ to which power lines L2$u$, L2$v$ and L2$w$, respectively, are connected).

PCU 60 includes a converter 61, and inverters 62 and 63.

Converter 61 is connected to input terminals Cbp and Cbn (that is, battery 70) via positive line PL1 and negative line NL1, respectively. Converter 61 is also connected to inverters 62 and 63 via positive line PL2 and negative line NL1, respectively.

Converter 61 includes a reactor LA1, switching elements Q1 and Q2, and diodes D1 and D2. Each of switching elements Q1 and Q2 is controlled by a control signal from ECU 200. In a voltage-up operation mode, converter 61 converts voltage VL between positive line PL1 and negative line NL1 to a level equal to or greater than voltage VL to output the converted voltage between positive line PL2 and negative line NL1. In a voltage-down operation mode, converter 61 converts voltage VH between positive line PL2 and negative line NL1 to a level less than or equal to voltage VH to output the converted voltage between positive line PL1 and negative line NL1.

Inverter 62 is provided between converter 61 and output terminal C1. Inverter 63 is provided between converter 61 and output terminal C2. Inverters 62 and 63 are connected parallel to each other relative to converter 61. Inverters 62 and 63 basically have the same configuration. In the following, mainly inverter 62 will be described, and description for inverter 63 will not be repeated in principle.

Inverter 62 includes switching elements Q3-Q8 and diodes D3-D8. Switching elements Q3 and Q4 are connected in series between positive line PL2 and negative line NL1, constituting the upper and lower arms of U-phase. Switching elements Q5 and Q6 are connected in series between positive line PL2 and negative line ND, constituting the upper and lower arms of V-phase. Switching elements Q7 and Q8 are connected in series between positive line PL2 and negative line NL1, constituting the upper and lower arms of W-phase. Intermediate points 15-17 of the upper and lower arms of each phase are connected to output terminals C1$u$, C1$v$ and C1$w$, respectively.

The switching operation of switching elements Q3-Q8 is controlled by a control signal from ECU 200. Inverter 62 converts DC power supplied from converter 61 into 3-phase AC power for output to output terminals C1$u$, C1$v$, C1$w$ (i.e. power lines L1u, L1v, L1w), respectively, in accordance with the switching operation of switching elements Q3-Q8.

Current sensor 24 detects the phase current output from inverter 62 in each phase and provides the detection result to ECU 200. Since the sum of the instantaneous values of each phase current of the U-phase, V-phase and W-phase is zero, current sensor 24 is just arranged so as to detect any two of the three phase currents, as shown in FIG. 3. It is to be noted that current sensor 24 is also arranged at the side of inverter 63.

A resolver 25 detects the degree of rotation of the rotor of first MG 20. ECU 200 can calculate the rotation phase and/or rotation speed Nm1 of first MG 20 based on the output from resolver 25. It is to be noted that resolver 25 is also provided at the side of second MG 30.

As described above, positive branch line PLehc branches off from W-phase power line L1w to be connected to one end of EHC 140. Negative branch line NLehc branches off from negative line NLb to be connected to the other end of EHC 140. In other words, EHC 140 is connected between W-phase power line L1w and negative line NLb.

Junction box 100 includes a relay R1 provided on positive branch line PLehc and a relay R2 provided on negative branch line NLehc. The on and off operations of each of relays R1 and R2 is controlled by a control signal from ECU 200.

Figure 4:
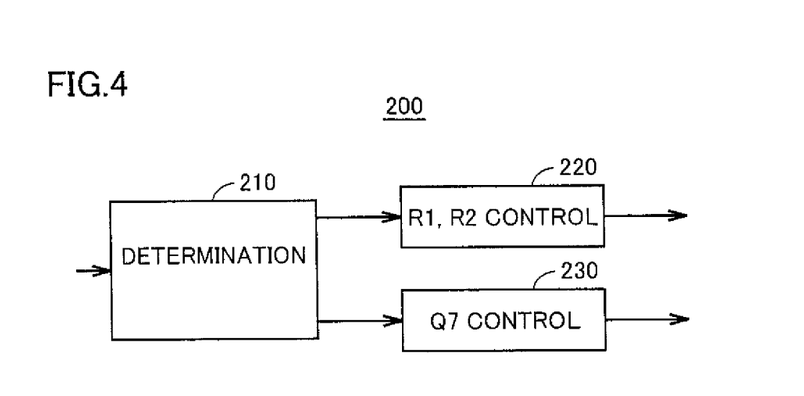
FIG. 4 represents a first functional block diagram of the ECU.

FIG. 4 is a functional block diagram of ECU 200 in the event of warming up EHC 140 during an EV-running mode. Each of the functional blocks in FIG. 4 may be implemented by hardware or by software.

ECU 200 includes a determination unit 210, a first control unit 220, and a second control unit 230.

During an EV-running mode, determination unit 210 determines the requirement of starting warm up of EHC 140 to be ready for future transition to the HV-running mode (start of engine 10). When determination unit 210 determines that the state of charge SOC of battery 70 is below a predetermined value (i.e. the distance that can be continued in EV-running becomes less than a predetermined distance) and on the presumption that the temperature of EHC 140 has not arrived at the catalyst activation temperature, a determination is made that warm up of EHC 140 has to be started. Further, determination unit 210 estimates the period of time before the transition to HV-running from the current time, the temperature of EHC 140, and the like to determine whether the energy required for warming up EHC 140 is greater or not than a predetermined energy based on the estimation result.

First control unit 220 controls relays R1 and R2 in junction box 100 according to the determination result by determination unit 210. For example, first control unit 220 closes (ON) relays R1 and R2 and opens (OFF) relays R1 and R2 when starting warm up of EHC 140 is required and not required, respectively.

Second control unit 230 controls the W-phase upper arm in inverter 62, i.e. switching element Q7, according to the determination result by determination unit 210. For example, second control unit 230 closes (ON) switching element Q7 and opens (OFF) switching element Q7 when the energy required to warm up EHC 140 is greater than a predetermined energy and not, respectively.

Figure 5:
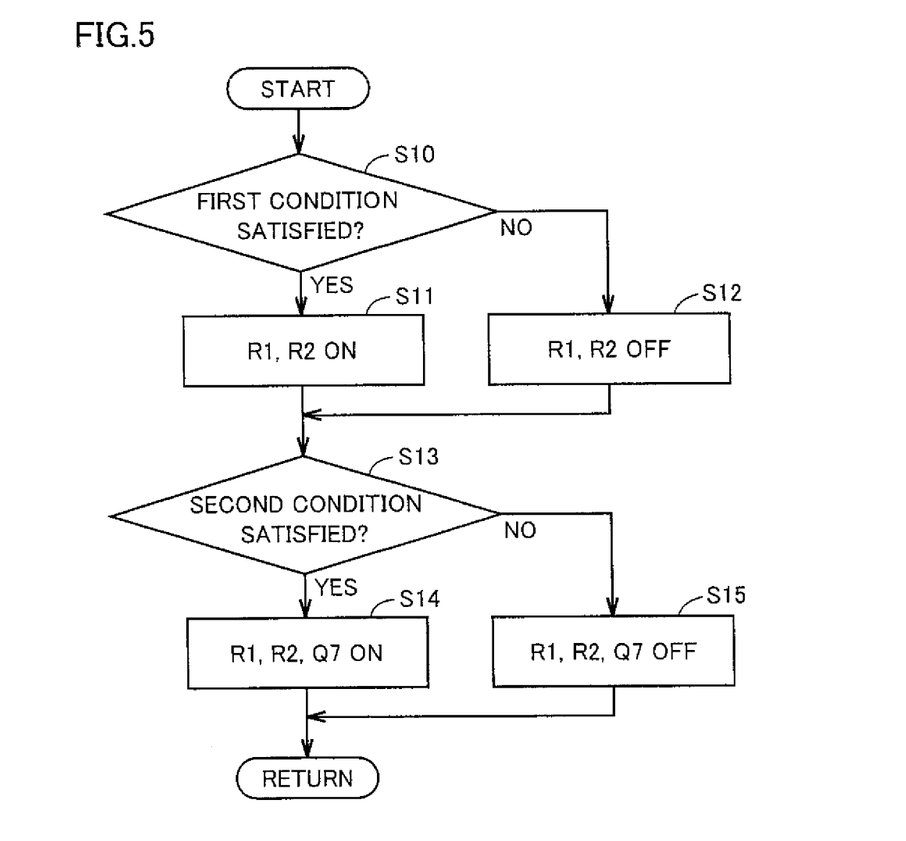
FIG. 5 is a first flowchart of the processing procedure of the ECU.

FIG. 5 is a flowchart representing the processing procedure to implement the feature of ECU 200 set forth above. The procedure according to the flowchart of FIG. 5 is executed repeatedly in a predetermined cycle during an EV-running mode.

ECU 200 determines whether a first condition has been established or not at step (hereinafter, step is abbreviated as "S" hereinafter) 10. This first condition corresponds to the case where warm up of EHC 140 has to be started and the energy required for warm up of EHC 140 is smaller than a predetermined energy. When the first condition is satisfied (YES at S10), control proceeds to S11 where ECU 200 sets relays R1 and R2 on, otherwise (NO at S10), control proceeds to S12 where ECU 200 sets relays R1 and R2 off.

Further, at S13, ECU 200 determines whether a second condition is satisfied or not. For example, the second condition corresponds to the case where warm up of EHC 140 has to be started and the energy required for warm up of EHC 140 is greater than the predetermined energy.

When the second condition is satisfied (YES at S13), control proceeds to S14 where ECU 200 sets relays R1, R2, and switching element Q7 on. When the second condition is not satisfied (NO at S13), control proceeds to S15 where ECU 200 sets relays R1, R2, and switching element Q7 off.

Figure 6:
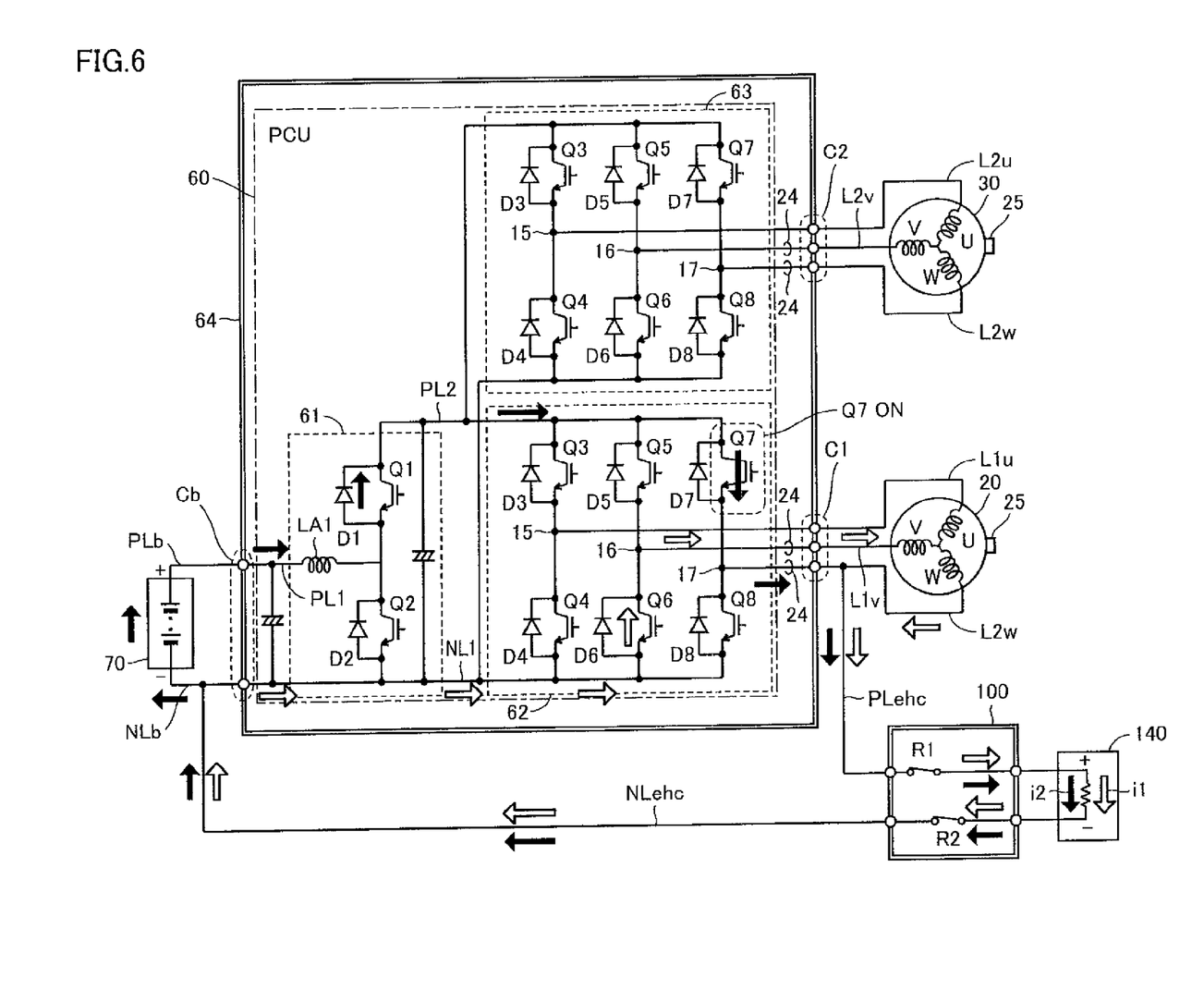
FIG. 6 is a first diagram representing the flow of current supplied to the EHC.

FIG. 6 represents the flow of current supplied to EHC 140 when EHC 140 is to be warmed up according to ECU 200 during an EV-running mode. In an EV-running mode, ECU 200 controls converter 61 and inverter 63 by pulse width modulation control (hereinafter, also referred to as "PWM control") to drive second MG 30 by the electric power of battery 70. Since first MG 20 does not have to be driven at this stage, ECU 200 sets inverter 62 at a stop state (open state of switching elements Q3-Q8). However, first MG 20 is rotated in the negative direction in response to second MG 30 being rotated in the positive direction since engine rotation speed Ne=0 in the HV-running mode (hereinafter, this rotation of first MG 20 is referred to as "associated rotation"). By this associated rotation of first MG 20, a potential difference caused by the back electromotive force of first MG 20 occurs between 3-phase power lines L1u, L1v and L1w of first MG 20.

In the present embodiment, EHC 140 is connected between W-phase power line L1w of first MG 20 and negative line NLb. Therefore, the closing of relays R1 and R2 (the process of S11 in FIG. 5) by ECU 200 causes a closed circuit to be formed between first MG 20 and EHC 140, whereby the voltage caused by the back electromotive force of first MG 20 is applied to EHC 140. Accordingly, current i1 caused by the back electromotive force of first MG 20 is supplied to EHC 140. As a result, EHC 140 can be warmed up utilizing current i1 induced by the back electromotive force of first MG 20. The open arrow in FIG. 6 represents the direction and route of current i1. As shown in FIG. 6, current i1 circulates between first MG 20 and EHC 140 through the route of first MG 20, power line L1w, positive branch line PLehc, EHC 140, negative branch line NLehc, negative lines NLb, NL1, diode D6, and power line L1v. This circulation route of current i1 differs from the current applying path between battery 70 and first MG 20. Current i1 does not flow in a direction opposite to the direction of the open arrow in FIG. 6 due to the function of diode D6.

Further, by the closing of switching element Q7 in addition to relays R1 and R2 by ECU 200 (the process of S14), a close circuit is also formed between battery 70 and EHC 140, whereby output voltage VH from converter 61 is applied to EHC 140 via inverter 62. Therefore, in addition to current i1 by the back electromotive force of first MG 20, current i2 from battery 70 can be supplied to EHC 140. This speeds the warming up of EHC 140. The solid arrow in FIG. 6 represents the direction and path of current i2. Current i2 circulates between battery 70 and EHC 140 through the route of battery 70, positive lines PLb, PL1, diode D1, positive line PL2, switching element Q7, power line L1w, positive branch line PLehc, EHC 140, negative branch line NLehc and negative line NLb.

In the present embodiment, EHC 140 is connected to power line L1 and negative line NLb provided outside case 64 of PCU 60. Therefore, EHC 140 can be connected with PCU 60 without having to newly provide a terminal at case 64 of PCU 60.

Since currents i1 and i2 are both supplied to EHC 140 via inverter 62, detection by current sensor 24 is possible. Therefore, the current applying amount to EHC 140 can be detected without having to newly provide a current sensor.

Thus, vehicle 1 according to the present embodiment has EHC 140 connected between power line L1w and negative line NLb. Therefore, EHC 140 can be warmed up by supplying current i1 caused by the back electromotive force of first MG 20 and/or current i2 from battery 70 to EHC 140.

The present embodiment has been described corresponding to the case where positive branch line PLehc is divided from power line L1w provided external to case 64. The point where positive branch line PLehc branches off may be any point between inverter 62 and first MG 20. Therefore, positive branch line PLehc may be directly connected to output terminal C1w, for example. Further, positive branch line PLehc may be branched off from a line (inside case 64) connecting inverter 62 with output terminal C1.

The present embodiment has been described corresponding to the case where negative branch line NLehc is divided from negative line NLb provided external to case 64. The point where negative branch line NLehc branches off is not limited thereto, For example, negative branch line NLehc may be connected directly to input terminal Cbn. Further, negative branch line NLehc may be branched off from negative line NL1 (inside case 64).

The present embodiment has been described corresponding to the case where the present invention is applied to, but not limited to, a plug-in type hybrid vehicle having a higher necessity of warming up catalyst. The present invention may be applied to a general hybrid vehicle. Furthermore, the present invention may be applied to an electrically driven vehicle including an engine for usage other than a driving source instead of a hybrid vehicle including an engine as the driving force.

[Second Embodiment]

The previous first embodiment was described corresponding to the case where switching element Q7 is simply set on when current i2 from battery 70 is to be supplied to EHC 140 during an EV-running mode.

In the second embodiment, current i1 caused by the back electromotive force of first MG 20 is estimated based on the detection result of resolver 25 to subject switching element Q7 to PWM control according to the estimated result and adjust current i2 from battery 70. Thus, the current applying amount to EHC 140 can be stabilized. The remaining structure, function, and process are similar to those of the first embodiment set forth above. Therefore, detailed description thereof will not be repeated.

Figure 7:
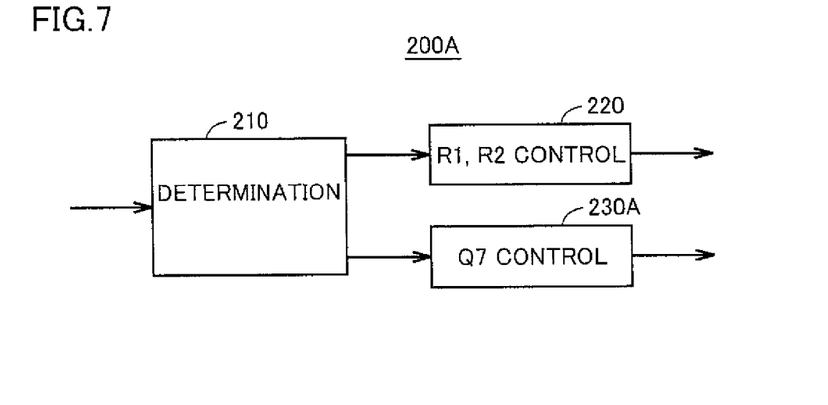
FIG. 7 is a second functional block diagram of the ECU.

FIG. 7 is a functional block diagram of an ECU 200A according to the present embodiment. Functional blocks in FIG. 7 having a reference number identical to that of the functional block in FIG. 4 set forth above has already been described. Therefore, detailed description thereof will not be repeated.

ECU 200A includes a determination unit 210, a first control unit 220, and a second control unit 230A.

Second control unit 230A subjects switching element Q7 to PWM control according to the determination result from determination unit 210. For example, second control unit 230A obtains the rotation phase and rotation speed of first MG 20 based on the detection result from resolver 25 to estimate current i1 caused by the back electromotive force of first MG 20 based on the obtained rotation phase and rotation speed. Second control unit 230A subjects switching element Q7 to PWM control according to estimated current i1, and adjusts current i2 such that the current applying amount to EHC 140 (average of the total of currents i1, i2) attains a predetermined target value.

Figure 8:
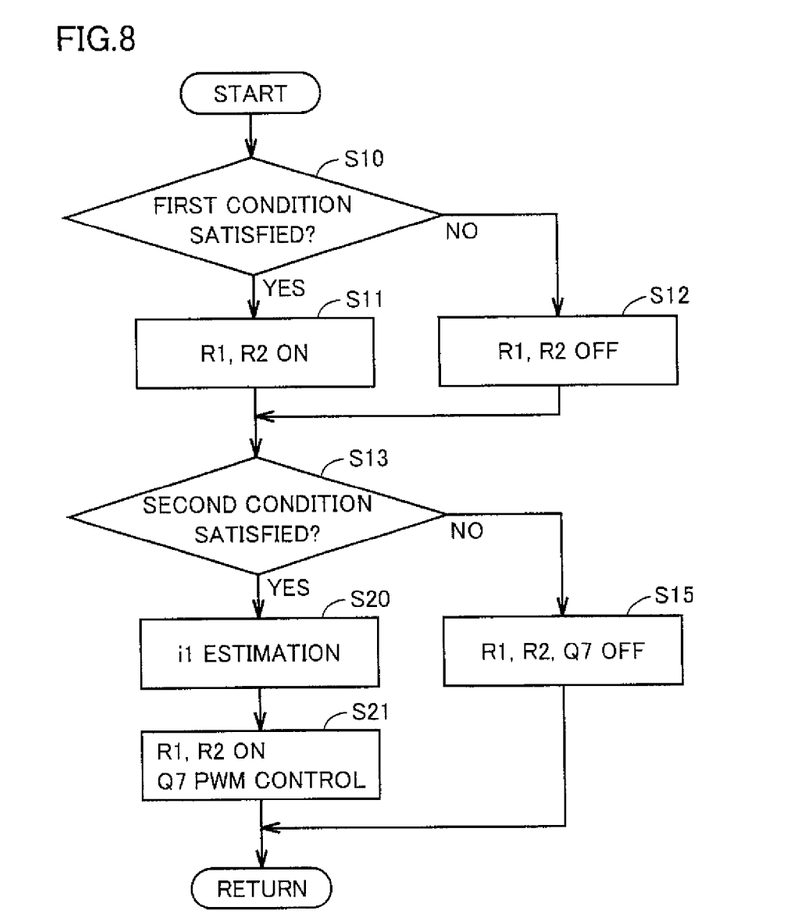
FIG. 8 is a second flowchart of the processing procedure of the ECU.

FIG. 8 is a flowchart representing the processing procedure to realize the function of ECU 200A set forth above. In the flowchart of FIG. 8, the processes identical to those in the flowchart of FIG. 5 set forth above has the same step number allotted. Therefore, detailed description will not be repeated here.

When the second condition is satisfied (YES at step S13), control proceeds to S20 where ECU 200 estimates current i1 caused by the back electromotive force of first MG 20 based on the detection result from resolver 25. At S21, ECU 200 sets relays R1 and R2 on and subjects switching element Q7 to PWM control based on current i1 and voltage VH to adjust current i2.

Figure 9:
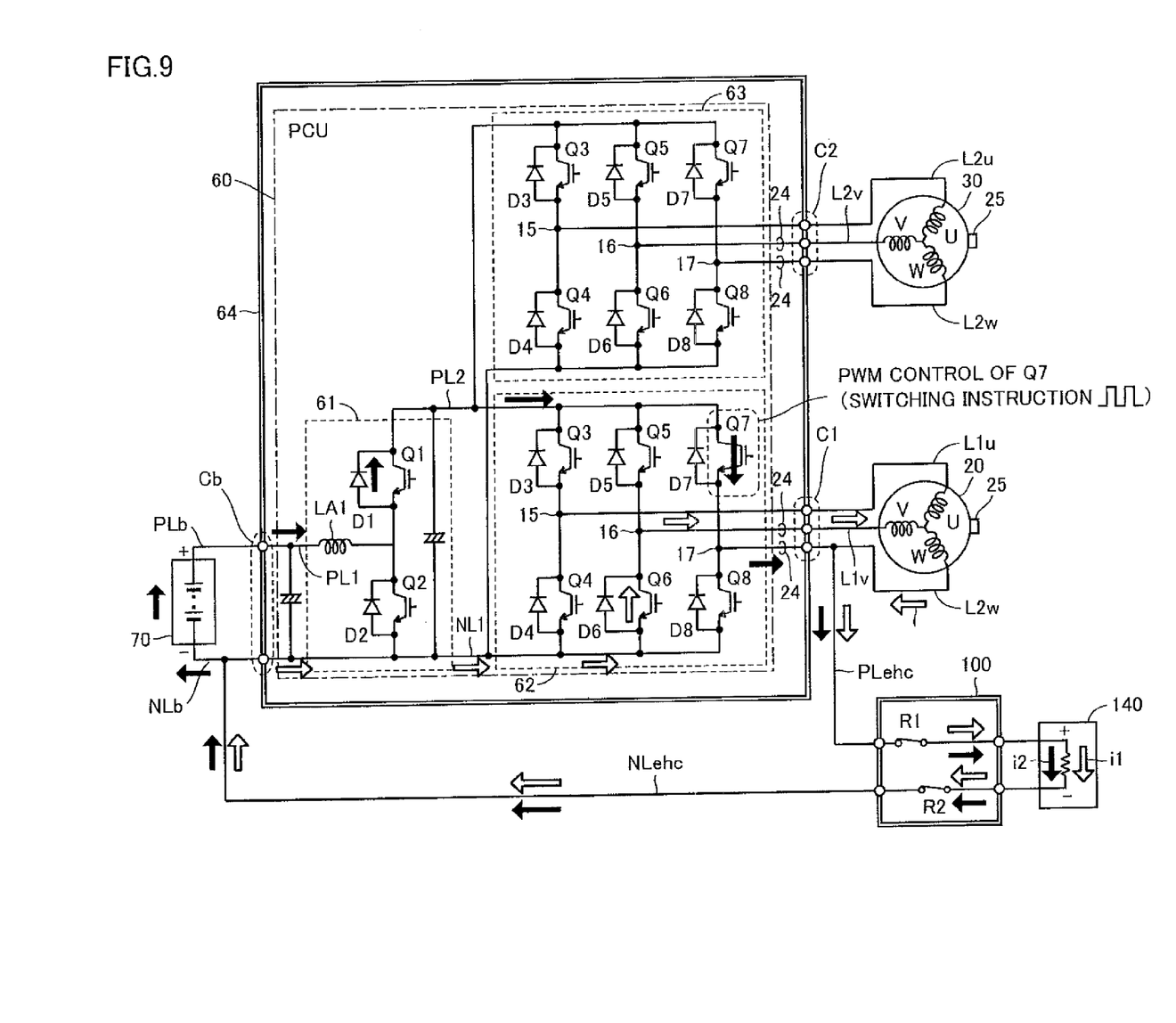
FIG. 9 is a second diagram representing the flow of current supplied to the EHC.

FIG. 9 represents the flow of current supplied to EHC 140 according to ECU 200A when EHC 140 is to be warmed up during an EV-running mode. The circulation path of currents i1 and i2 is similar to that (refer to FIG. 6) described in the first embodiment set forth above. ECU 200A adjusts current i2 by the PWM control of switching element Q7.

Figure 10:
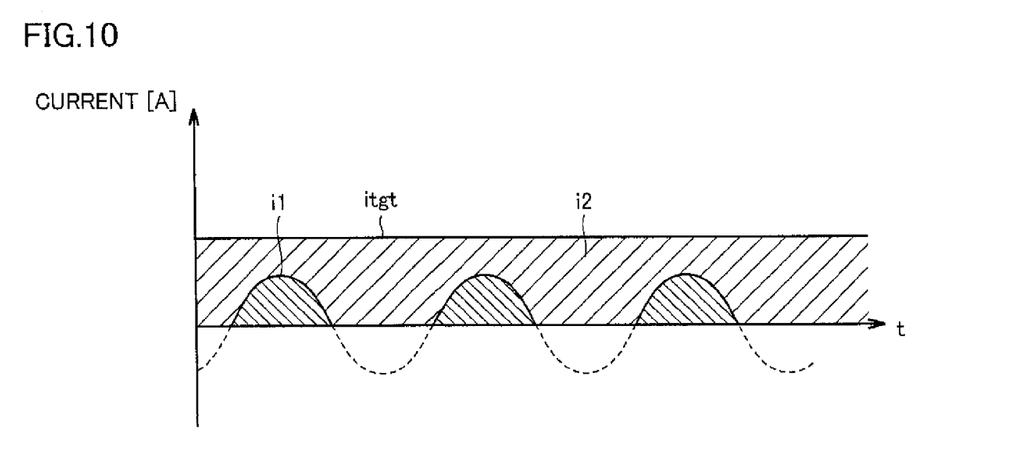
FIG. 10 represents an example of adjustment of current i2.

FIG. 10 represents an example of adjustment of current i2. Current i1 caused by the back electromotive force of first MG 20 exhibits a semi-sine wave, as shown in FIG. 10 by the function of diode D6, as compared to the general case exhibiting a sine wave. The phase and size of the semi-sine wave of current i1 depend upon the rotation phase and the rotation speed Nm1 of first MG 20. ECU 200A estimates the waveform of current i1 by the detection result from resolver 25, and subjects switching element Q7 to PWM control so as to compensate for the difference between a target current applying amount itgt and current i1 by current i2. Accordingly, even in the case where current i1 and/or voltage VH varies, current i2 can be adjusted in small steps corresponding to these variations. As a result, the current applying amount to EHC 140 can be set stabilized.

[Third Embodiment]

The first embodiment was described corresponding to the case where EHC 140 is connected between power line L1w and negative line NLb.

In the third embodiment, EHC 140 is connected between power line L1v and power line L1w and the connection of inverter 62 is selectively switched to either first MG 20 or EHC 140. The remaining structure, function, and processing are similar to those of the first embodiment set forth above. Therefore, detailed description thereof will not be repeated.

Figure 11:
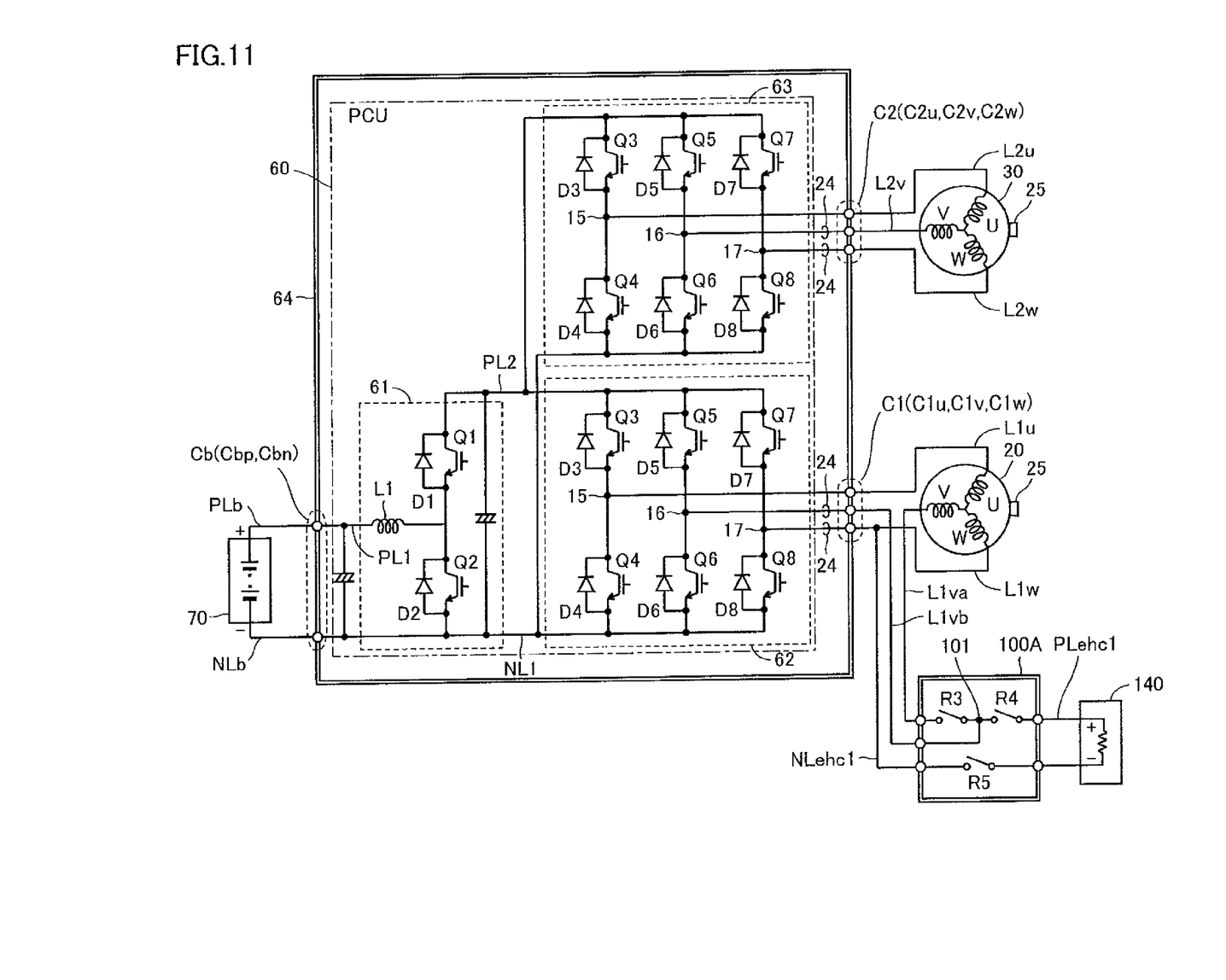
FIG. 11 represents a second circuit configuration of a first MG, a second MG, a PCU, a battery, and an EHC.

FIG. 11 represents a circuit configuration of first MG 20, second MG 30, PCU 60, battery 70, and EHC 140 according to the present embodiment. Any element in FIG. 11 having a reference character identical to that of the element in FIG. 3 set forth above has already been described. Therefore, detailed description thereof will not be repeated.

EHC 140 has one end connected to positive branch line PLehc1 branched off from V-phase power line L1v of first MG 20 (specifically, connection point 101 of power lines L1va, L1vb). The other end of EHC 140 is connected to negative branch line NLehc1 branching off from power line L1w of first MG 20 in the W-phase.

Junction box 100A includes a relay R3 provided on power line L1va, a relay R4 provided on positive branch line PLehc1, and relay R5 provided on negative branch line NLehc1.

Figure 12:
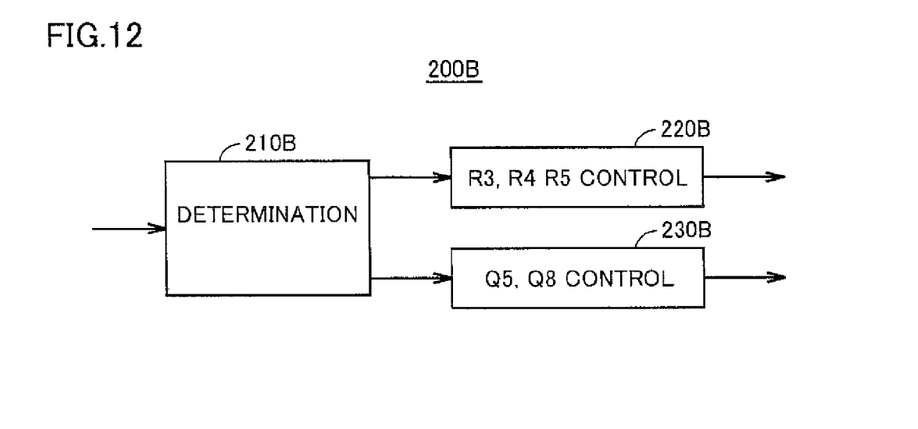
FIG. 12 is a third functional block diagram of the ECU.

FIG. 12 is a functional block diagram of an ECU 200B according to the present embodiment. ECU 200B includes a determination unit 210B, a first control unit 220B, and a second control unit 230B.

Determination unit 210B determines whether first MG 20 has to be driven or not. For example, determination unit 210B determines that first MG 20 has to be driven when in an HV-running mode. Further, determination unit 210B determines whether it is necessary to warm up EHC 140 during an EV-running mode.

First control unit 220B controls relays R3-R5 according to the determination result from determination unit 210B. Second control unit 230B controls switching elements Q5 and Q8 according to the determination result of determination unit 210B.

Figure 13:
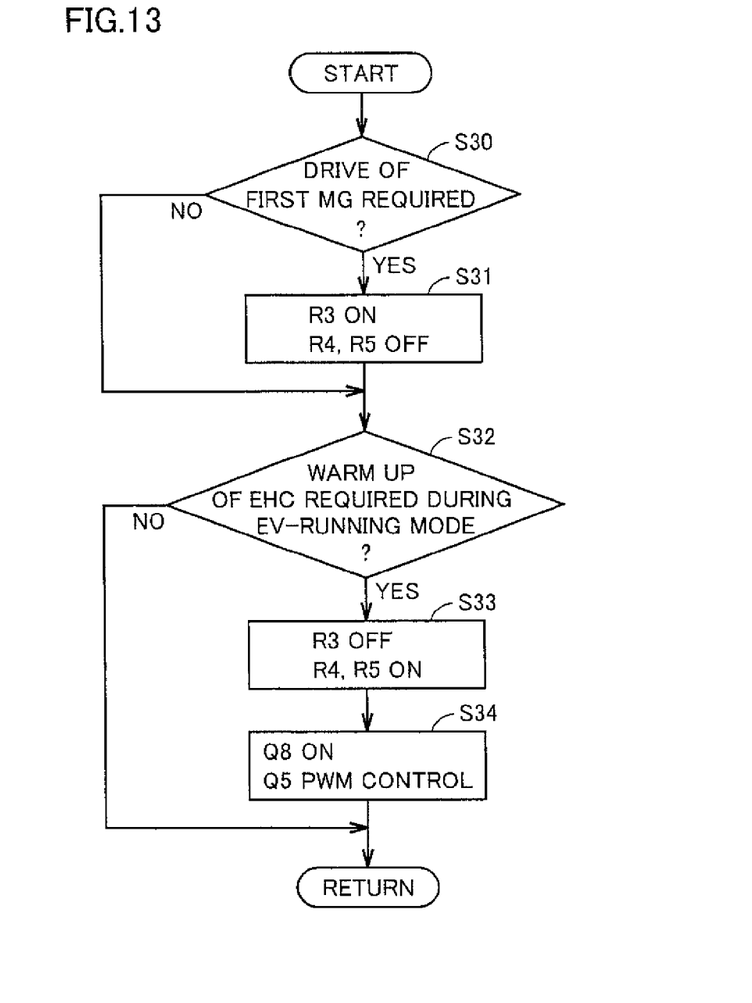
FIG. 13 is a third flowchart of the processing procedure of the ECU.

FIG. 13 is a flowchart of the processing procedure to implement the function of ECU 200B. The procedure in the flowchart of FIG. 13 is repeatedly executed at a predetermined cycle during a running mode of vehicle 1.

At S30, ECU 200B determines whether first MG 20 has to be driven or not.

When first MG 20 has to be driven (YES at S30), control proceeds to S31 where ECU 200B sets relay R3 on and relays R4 and R5 off.

When first MG 20 does not have to be driven (NO at S30), control proceeds to S32 where ECU 200B determines whether it is necessary to warm up EHC 140 during an EV-running mode.

When EHC 140 has to be waned up (YES at S32), control proceeds to S33 where ECU 200B sets relay R3 off and relays R4 and R5 on. At S34, ECU 200B sets switching element Q8 on and subjects switching element Q5 to PWM control.

Figure 14:
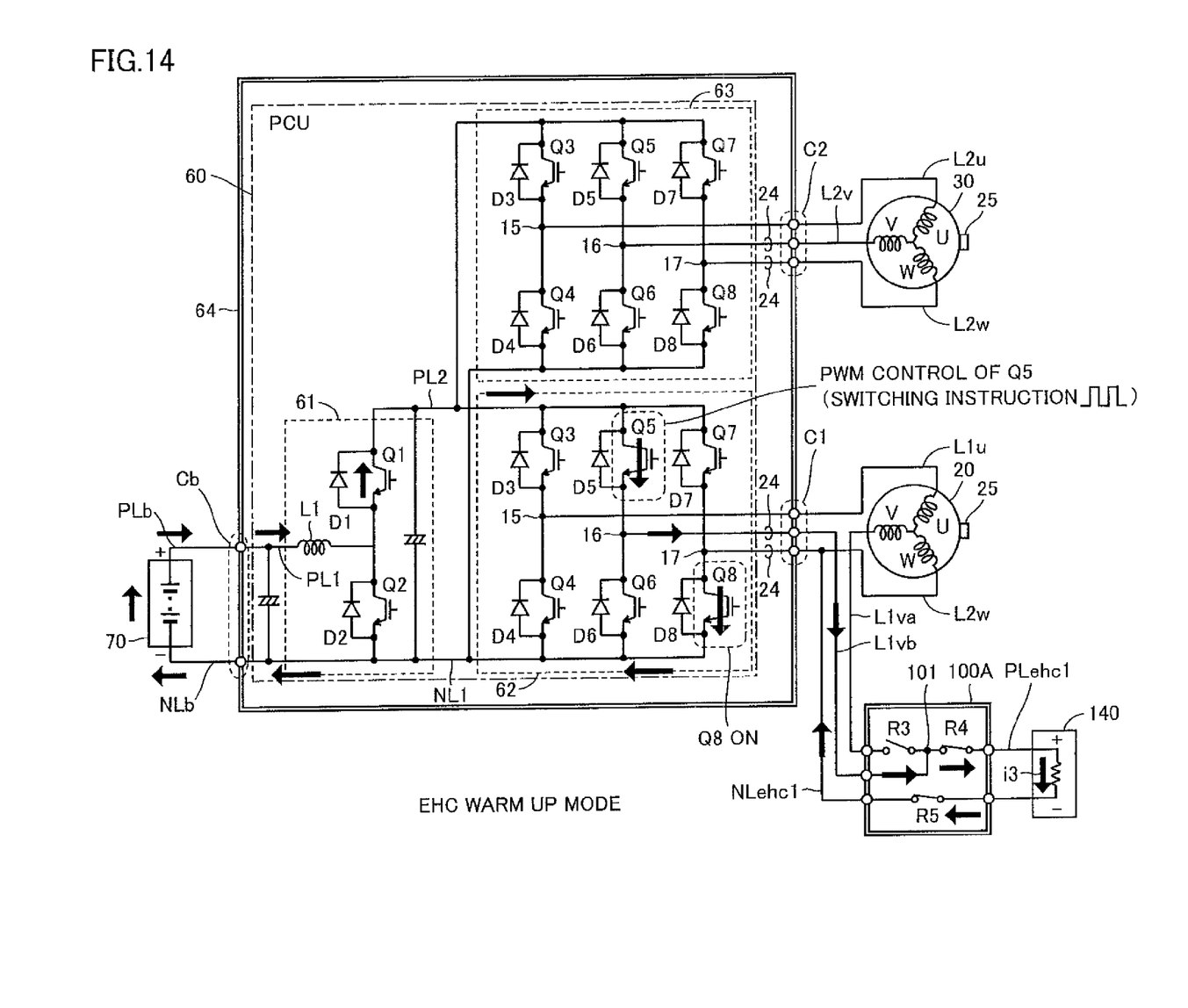
FIG. 14 is a third diagram representing the flow of current supplied to the EHC.

FIG. 14 represents the flow of current supplied to EHC 140 when EHC 140 is to be warmed up during an EV-running mode. When EHC 140 is to be warmed up in an EV-running mode, ECU 200B sets relay R3 off and relays R4, R5 as well as switching element Q8 on, and subjects switching element Q5. to PWM control (S33, S34 in FIG. 13). Accordingly, the connection of inverter 62 corresponds to EHC 140. Current i3 from battery 70 is supplied to EHC 140 via inverter 62. The solid arrow in FIG. 14 represents the direction and route of current i3. Current i3 circulates between battery 70 and EHC 140 through the path of battery 70, positive lines PLb, PL1, diode D1, positive line PL2, switching element Q5, power line L1vb, positive branch line PLehc1, EHC 140, negative branch line NLehc1, and negative line NLb. Thus, EHC 140 is warmed up.

In this state, EHC 140 is electrically isolated from first MG 20. Therefore, although there is a possibility of eddy current being generated by the back electromotive force of first MG 20 depending upon the vehicle speed during an EV-running mode, supply of such eddy current to EHC 140 can be prevented.

When first MG 20 has to be driven, ECU 200B sets relay R3 on and relays R4 and R5 off (S31 in FIG. 13). Accordingly, inverter 62 will be connected to first MG 20, allowing the normal control of first MG 20.

Similarly in this state, EHC 140 is electrically isolated from first MG 20. Therefore, the current applying path of EHC 140 is disconnected. Thus, the supply of current not required to EHC 140 can be avoided.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

Reference Signs List 1 vehicle; 10 engine; 20 first MG 30 second MG; 24 current sensor; 25 resolver; 40 power split device; 50 reduction gear; 60 PCU; 61 converter; 62, 63 inverter; 64 case; 70 battery; 80 drive wheel; 100, 100A junction box; 101 connection point; 130 exhaust manifold; 140 EHC; 160 charge port; 170 charger; 200 ECU; 210, 210B determination unit; 220, 220B first control unit; 230, 230A, 230B second control unit; 300 connector; 310 external power supply; C1, C2 output terminal, Cb input terminal; D1-D8 diode; L1, L2 power line; LA1 reactor; NL1, NLb negative line; NLehc, NLehc1 negative branch line; PL1, PL2, PLb positive line; PLehc, PLehc1 positive branch line; Q1-Q8 switching element; R1-R5 relay.

The invention claimed is:

1. A vehicle comprising:
   a power storage device,
   a conversion device connected to said power storage device via a positive line and a negative line to convert DC current from said power storage device into AC current,
   a first motor connected to said conversion device via a first plurality of power lines, and driven by the AC current converted at said conversion device,
   a second motor connected to said conversion device via a second plurality of power lines, and driven by the AC current converted at said conversion device,
   an engine coupled to said first and second motors via a planetary gear device, and
   an electrically heated catalyst device for purifying exhaust from said engine,
   said catalyst device having one end connected to a first branch line branching off from any one of said first plurality of power lines, and heated by current supplied via the first branch line.

2. The vehicle according to claim 1, wherein another end of said catalyst device at a side opposite to said one end is connected to a second branch line branching off from said negative line.

3. The vehicle according to claim 2, wherein
   said first motor is rotated by a power of said second motor transmitted via said planetary gear device to generate back electromotive force, during a motor-running mode in which said vehicle runs by power of said second motor in a state where said engine is stopped,
   said catalyst device is heated by current generated by the back electromotive force of said first motor, circulating between said first motor and said catalyst device through said first and second branch lines, during said motor-running mode.

4. The vehicle according to claim 3, wherein
   said conversion device includes
   a converter converting voltage from said power storage device for output,
   a first inverter converting DC current output from said converter into AC current for output onto said first plurality of power lines, and
   a second inverter converting DC current output from said converter into AC current for output onto said second plurality of power lines,
   said vehicle further comprising:
   an open/close circuit configured to enable a current applying path of said catalyst device to open and close, and
   a control device controlling said conversion device and said open/close circuit,
   wherein, during said motor-running mode, said control device controls current supplied to said second motor by controlling said converter and said second inverter, while controlling the current supplied to said catalyst device by controlling said open/close circuit and said first inverter.

5. The vehicle according to claim 4, wherein said control device closes said open/close circuit, when said catalyst device is to be warmed up during said motor-running mode, such that current generated by the back electromotive force of said first motor is supplied to said catalyst device via said first branch line.

6. The vehicle according to claim 4, wherein said control device controls said first inverter, when said catalyst device is to be warmed up during said motor-running mode, such that DC current output from said converter is supplied to said catalyst device.

7. The vehicle according to claim 4, wherein said control device controls said first inverter, when said catalyst device is to be warmed during said motor-running mode, such that voltage less than or equal to voltage output from said converter is applied to said catalyst device via said first inverter.

8. The vehicle according to claim 4, wherein, during said motor-running mode, said control device estimates the current generated by the back electromotive force of said first motor based on a rotation phase and rotation speed of said first motor, and controls said first inverter such that a current applying amount to said catalyst device is adjusted based on an estimated result.

9. The vehicle according to claim 1, wherein
   another end of said catalyst device at a side opposite to said one end is connected to a second branch line branching off from a power line among said first plurality of power lines, differing from the power line to which said first branch line is connected,
   said conversion device includes
   a converter converting voltage from said power storage device for output,
   a first inverter converting DC current output from said converter into AC current for output onto said first plurality of power lines, and
   a second inverter converting DC current output from said converter into AC current for output onto said second plurality of power lines,
   said vehicle comprising
   a switching device provided on said first branch line and a power line to which said first branch line is connected, configured to allow connection of said first inverter to be switched to one of said first motor and said catalyst device, and
   a control device controlling said conversion device and said switching device,
   said first motor rotated by power of said second motor transmitted via said planetary gear device to generate back electromotive force, during a motor-running mode in which said vehicle runs by the power of said second motor in a state where said engine is stopped, said control device causing DC current output from said converter to be supplied to said catalyst device via said first inverter by controlling said switching device such that said first inverter is connected to said catalyst device, when said catalyst device is to be warmed up during said motor-running mode.

10. The vehicle according to claim 9, wherein said control device controls a current applying amount to said catalyst device by controlling said first inverter.

\* \* \* \* \*